United States Patent [19]

Smith et al.

[11] Patent Number: 4,875,552
[45] Date of Patent: Oct. 24, 1989

[54] MODULAR ELEVATOR CAB CONSTRUCTION

[75] Inventors: Stephen W. Smith; Gilbert E. Londeen, both of Arkansas City; Christopher Lair, Wichita, all of Kans.

[73] Assignee: Montgomery Elevator Company, Moline, Ill.

[21] Appl. No.: 214,479

[22] Filed: Jul. 1, 1988

Related U.S. Application Data

[62] Division of Ser. No. 891,532, Jul. 29, 1986, Pat. No. 4,779,707.

[51] Int. Cl.⁴ ............................ B66B 9/00; E04B 1/38
[52] U.S. Cl. .................................... 187/1 R; 403/382; 403/205; 403/DIG. 10; 312/263; 160/135; 160/351
[58] Field of Search ................ 187/1 R; 52/282, 283, 52/285, 262, 806; 403/382, 403, 205, DIG. 10; 312/263, 257 SM, 257 A; 160/135, 351

[56] References Cited

U.S. PATENT DOCUMENTS

| | | | |
|---|---|---|---|
| 2,133,621 | 10/1938 | Klein | 187/1 R |
| 2,343,201 | 2/1944 | Nilson | 52/282 X |
| 3,113,358 | 12/1963 | Zell et al. | 52/285 X |
| 3,327,440 | 6/1967 | Watkins | 52/282 X |
| 3,529,394 | 9/1970 | Wilkins | 52/806 X |
| 3,631,942 | 1/1972 | Brounn | 187/1 R |
| 3,632,146 | 1/1972 | Buzby et al. | 52/285 X |
| 4,199,907 | 4/1980 | Bains et al. | 52/285 X |
| 4,357,993 | 11/1982 | Halpern et al. | 187/1 R |
| 4,479,737 | 10/1984 | Bergh et al. | 403/382 |
| 4,566,237 | 1/1986 | Turner | 52/806 X |

FOREIGN PATENT DOCUMENTS

| | | | |
|---|---|---|---|
| 1174425 | 9/1984 | Canada | 187/1 R |
| 713422 | 10/1931 | France | 187/1 R |

Primary Examiner—Joseph J. Rolla
Assistant Examiner—Stephen B. Parker
Attorney, Agent, or Firm—Wood, Dalton, Phillips Mason & Rowe

[57] ABSTRACT

A modular elevator cab construction is provided for assembly onto a platform of an elevator cage substantially from within the area of the cab. A rear wall panel, two side wall panels and front wall structures are assembled by simple complementary interengaging hanger devices on the backside of the adjacent walls for assembling the walls in proper right-angular juxtaposition.

1 Claim, 4 Drawing Sheets

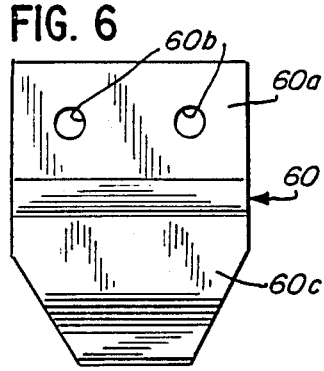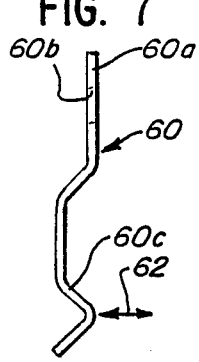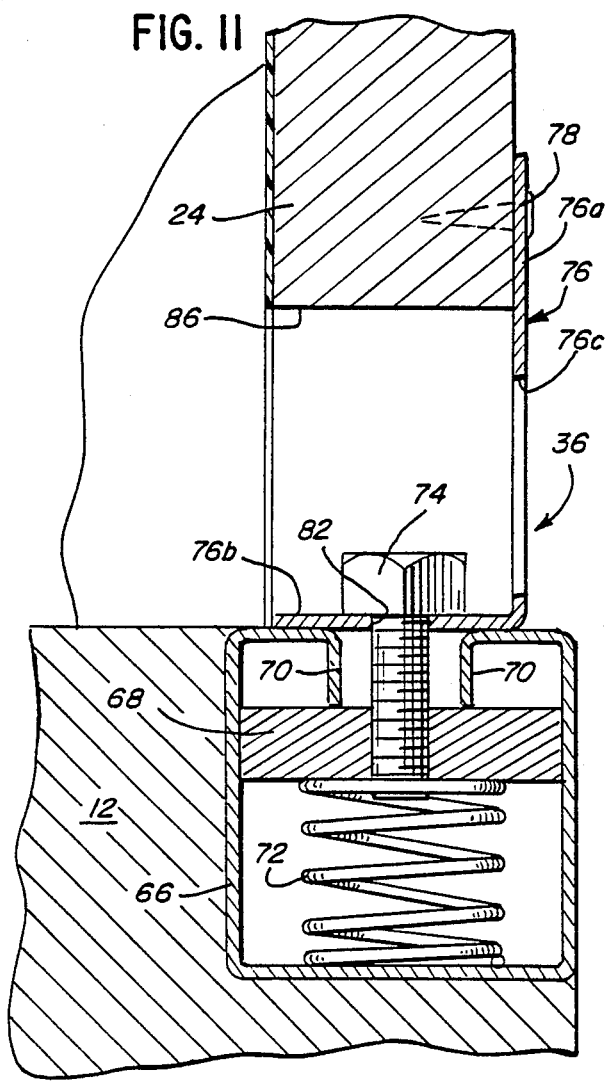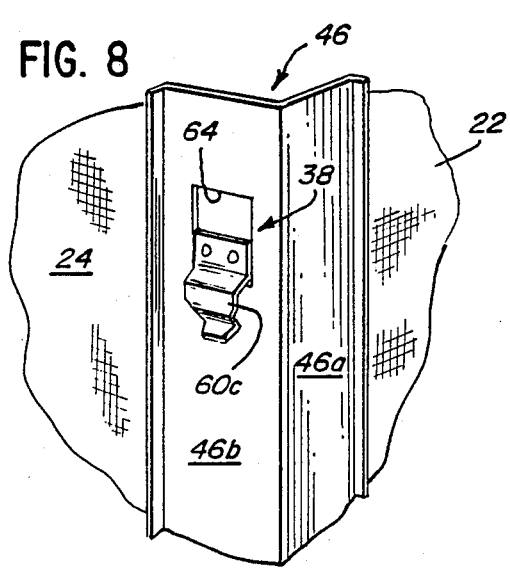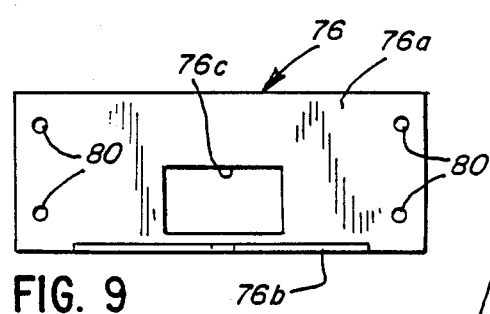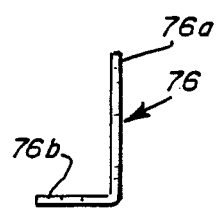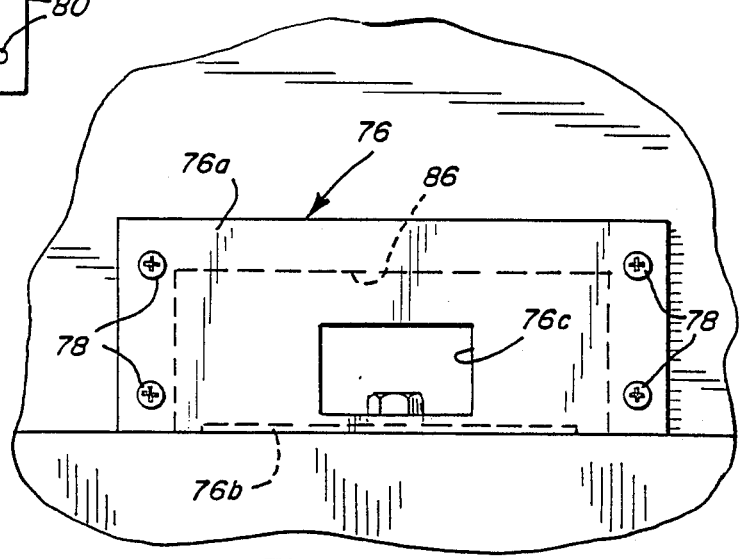

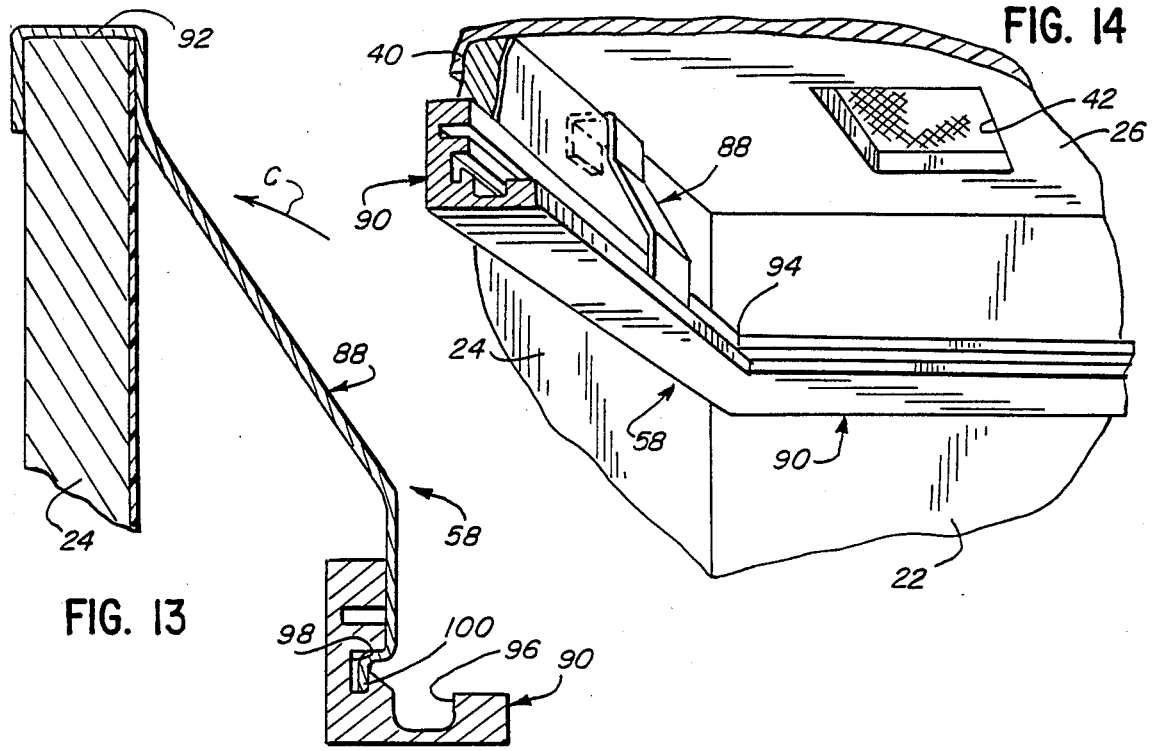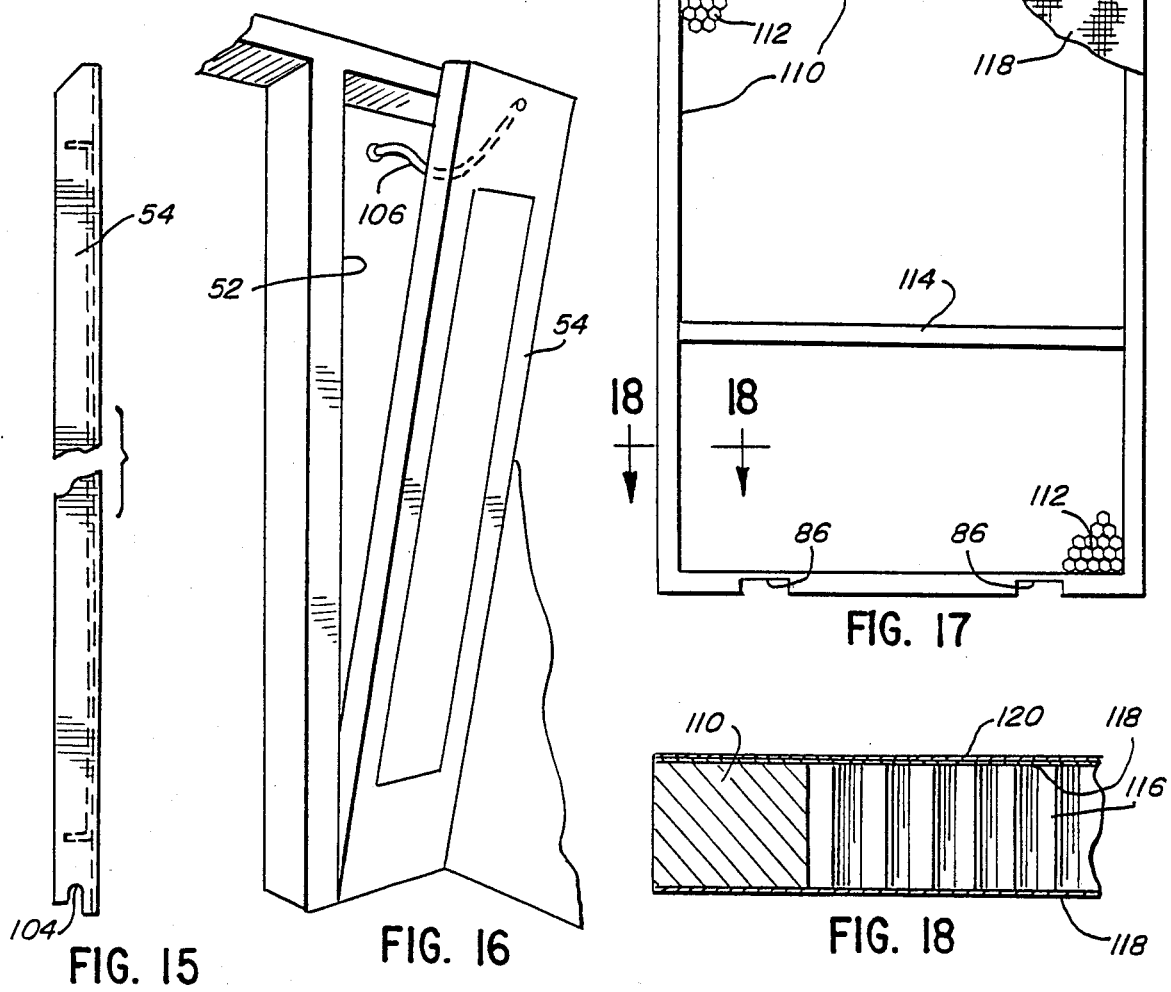

MODULAR ELEVATOR CAB CONSTRUCTION

This is a division of application Ser. No. 891,532 filed July 29, 1986 now U.S. Pat. No. 4,779,707.

BACKGROUND AND SUMMARY OF THE INVENTION

This invention generally relates to elevators and, in particular, to a modular construction for a lightweight elevator cab which can be assembled onto a platform in an elevator stile substantially from within the area of the cab.

It is not new to provide components for on-site construction of elevator cabs, but the actual procedures in constructing the cab on-site have varied little from factory construction of the cab as a preassembled cubicle for subsequent mounting in a stile. Metal wall panels have been assembled by means of external corner brackets secured to back and side panels. An obvious problem of on-site construction of elevator cabs is the restricted area within which the construction can be performed It normally takes approximately 8-10 team hours (or 16-20 man hours) to construction an elevator cab on-site onto a platform of an elevator stile with prior structures and procedures Heretofore, insofar as the inventor is aware, the only attempts to reduce the weight of elevator cabs have been by using lighter gage metals and lightweight metals such as aluminum Heretofore, there has been no elevator cab construction that is fairly described as modular. Furthermore, there has been no cab that can be assembled from components by a team working exclusively from within the area of the finished cab This need has not been fulfilled and the invention is directed to doing so. The modular elevator cab construction of this invention can be assembled by an experienced team on-site in approximately 1½ to 2 team hours (or 3-4 man hours), resulting in a completed elevator cab having walls, a canopy, a suspended drop ceiling and the appropriate elevator controls.

Incorporated with the modular concept of the invention is the use of extremely lightweight, yet very strong, composite wall panels not heretofore used in the elevator industry. The panels are constructed with a wood frame surrounding a honeycomb core. In comparison to what is considered a lightweight panel heretofore used, one fabricated of wood which weighs on the order of 3.5 pounds per square foot, the composite panel incorporated in the modular cab of this invention weighs on the order of 9 ounces per square foot. This not only reduces the overall cab weight which results in easier assembly, but the entire elevator system is rendered less expensive For instance, the size or horsepower of the motor can be reduced; the size and/or numbers of cables can be reduced; the dimensions of the stile and platform can be reduced; along with other related components.

An object, therefore, of the invention is to provide a new modular elevator cab construction for assembly on-site onto a platform of an elevator stile, the assembly being performed from within the area of the ultimately finished cab.

In the exemplary embodiment of the invention, the modular cab construction generally includes a rear wall panel and two side wall panels. Complementary interengaging hanger means are provided on the backside of adjacent panels for assembling the two side wall panels in proper righ-tangular juxtaposition to the rear wall panel. Anchoring means are provided between the platform and the lower edges of the wall panels. A canopy structure that surmounts the rear and side wall panels and the front wall has a peripheral skirt surrounding the upper ends of the panels and the front wall.

Specifically, the anchoring means include channel means embedded in the platform and bracket means secured in part to the backsides of the wall panels. Anchoring members secure the bracket means into the channel means Access openings are provided through the wall panels at the lower edges thereof for manipulating the anchoring members from within the cab area. The bracket means extend from the backside of the wall panels into the access openings overlying the channel means.

In order to accommodate the interengaging hanger means between adjacent rear wall and side wall panels, support means preferably project outwardly at a right-angle from one of the wall panels at each juncture between a rear wall panel and a side wall panel The hanger means include sets of receptacle means and complementary hanger members The receptacle means of each set are located either on one of the support means or the adjacent panel, and the respective hanger member of each set is located on the other of the support means or the adjacent panel, at each juncture.

Another feature of the invention is the provision of drop ceiling support means, and means for hanging the drop ceiling support means from the top edges of the wall panels. Specifically, the drop ceiling support means include a plurality of brackets having hooks for embracing the top edges of the wall panels. The support means are formed by elongated extruded members having grooves for receiving complementary interengaging lips at the lower distal ends of the brackets for maintaining the drop ceiling support means suspended from the top of the wall panels.

A further feature of the invention is the provision of a front wall structure having a recess for accommodating control components for the elevator, a control panel positionable to cover the recess, and complementary interengaging pivot means between the front wall structure and the control panel adjacent the bottom edge of the recess for tilting the control panel outwardly to gain access to the control components. Specifically, a rib is formed along the bottom edge of the recess, and a groove is formed in the bottom edge of the control panel for positioning over the rib, whereby the panel can be easily tilted away from the front wall.

The composite wall panels are fabricated with a wood frame surrounding a honeycomb core, with the frame and the core sandwiched between epoxy impregnated fiberglass sheets A cross frame member provides a mounting for the handrail means on the inside of the cab.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 6 is an enlarged elevational view of one of the hanger clips for the wall panels;

FIG. 7 is a side elevational view of the hanger clip of FIG. 6;

FIG. 8 is a fragmentary perspective view at the juncture of adjacent wall panels, illustrating the interengagement of the hanger clip;

FIG. 9 is an enlarged front elevational view of one of the anchoring brackets for the wall panels;

FIG. 10 is an end elevational view of the bracket

FIG. 11 is a vertical fragmentary section, on an enlarged scale, taken generally along line 11—11 of FIG. 4, illustrating the entire anchoring means between a wall panel and the elevator platform;

FIG. 12 is an elevational view looking at the rear of the anchoring bracket as viewed from the right in FIG. 11;

FIG. 13 is a vertical section through the bracket and extrusion for suspending a drop ceiling from the top edges of the wall panels, also seen in FIG. 5 to a smaller scale;

FIG. 14 is a partial perspective view looking upwardly into a corner of the elevator cab, illustrating the drop ceiling support means of FIG. 13;

FIG. 15 is a fragmented side elevational view of the tilt-out control panel;

FIG. 16 is a perspective view illustrating the control panel of FIG. 15 tilted away from a recess in the front wall of the elevator;

FIG. 17 is an elevational view, partially broken away, of one of the wall panels; and FIG. 18 is an enlarged fragmentary sectional view of a wall panel taken generally along line 18—18 of FIG. 17.

DETAILED DESCRIPTION OF THE PREFERRED EMBODIMENT

Figure 1:
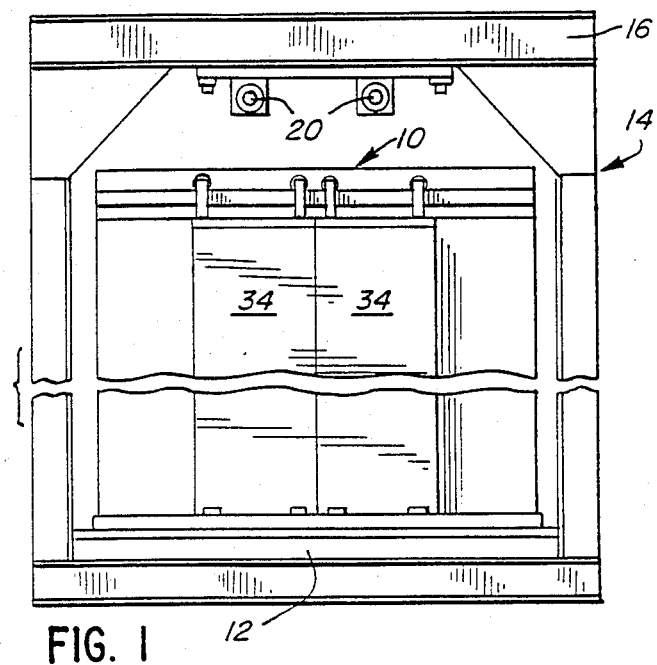
FIG. 1 is a front elevation of an elevator cage with a platform having the modular elevator cab construction of this invention assembled thereon.

Referring to the drawings in greater detail, and referring first to FIG. 1, the invention is directed to a modular elevator cab construction, generally designated 10, for assembly onto a platform 12 of an elevator stile 14. For a traction elevator, one or more lifting beams 16 carry bearing blocks 20 so that appropriate lifting mechanism can be secured to the lifting beams. In the case of a hydraulic elevator, of course, there is only a cross brace forming the stiles.

Figure 2:
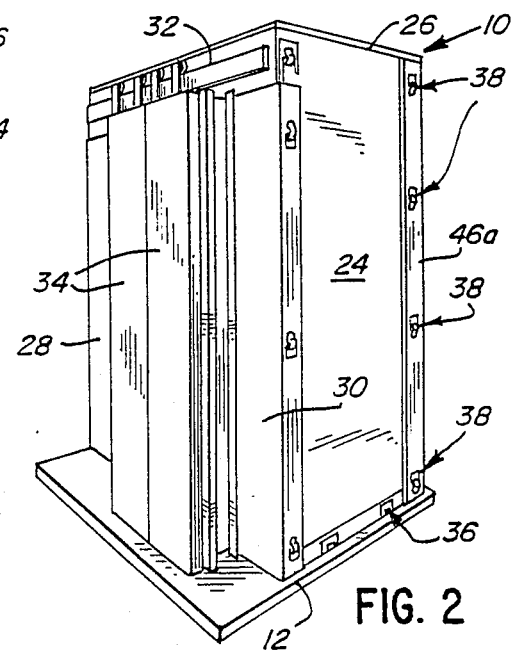
FIG. 2 is a perspective view of a completed, isolated elevator cab according to the invention.
Figure 3:
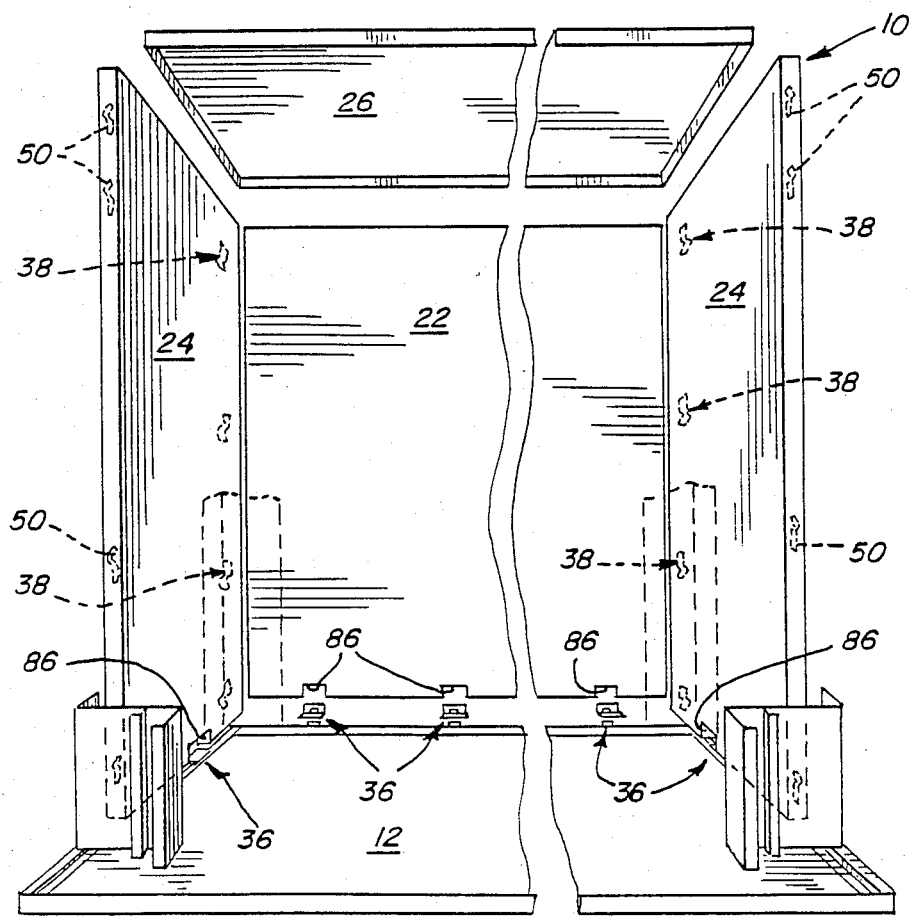
FIG. 3 is an exploded perspective view, on an enlarged scale, of various components of the modular elevator cab construction.

Referring to FIGS. 2 and 3, the modular elevator cab construction 10 includes a rear wall panel 22, two side wall panels 24, a canopy 26, left and right front wall structures 28 and 30, respectively, a header assembly 32 spanning the front wall structures, and a pair of sliding front doors 34.

Anchoring means, generally designated 36 (FIG. 3), are provided between platform 12 and the lower edges of rear wall panel 22 and side wall panels 24 Complementary interengaging hanger means, generally designated 38 (FIG. 2), are provided on the backside of adjacent wall panels 22,24 for assembling the panels in proper right-angular juxtaposition as shown in FIG. 2 The canopy 26 has a thin peripheral skirt 40 that closely embraces the upper ends of the rear and side panels and the head section 32. The canopy typically has openings 42 for fans or the like and emergency escape opening 44 as shown in phantom in FIG. 4.

Figure 4:
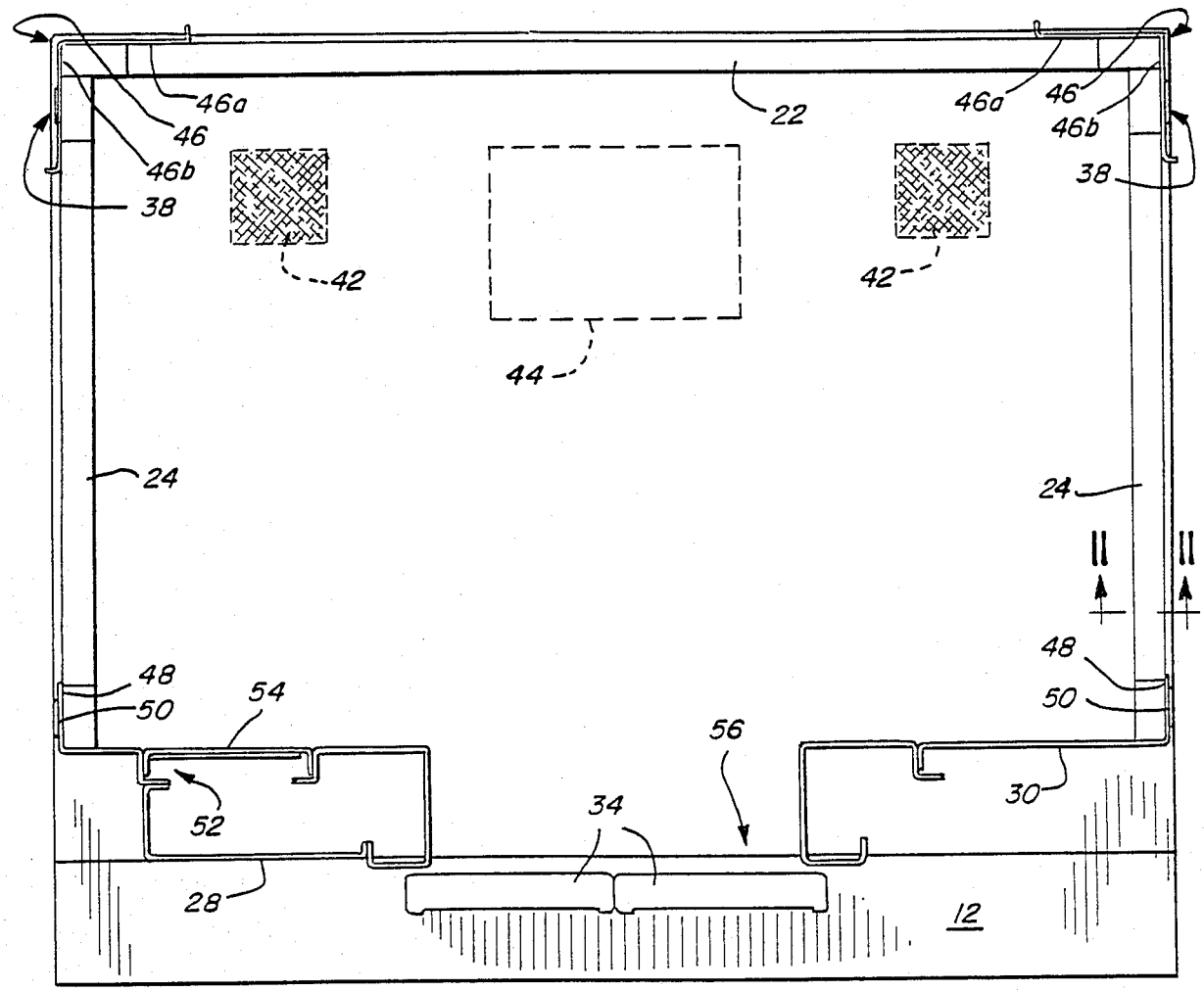
FIG. 4 is a plan view of a cab, on an enlarged scale, with the canopy removed.
Figure 5:
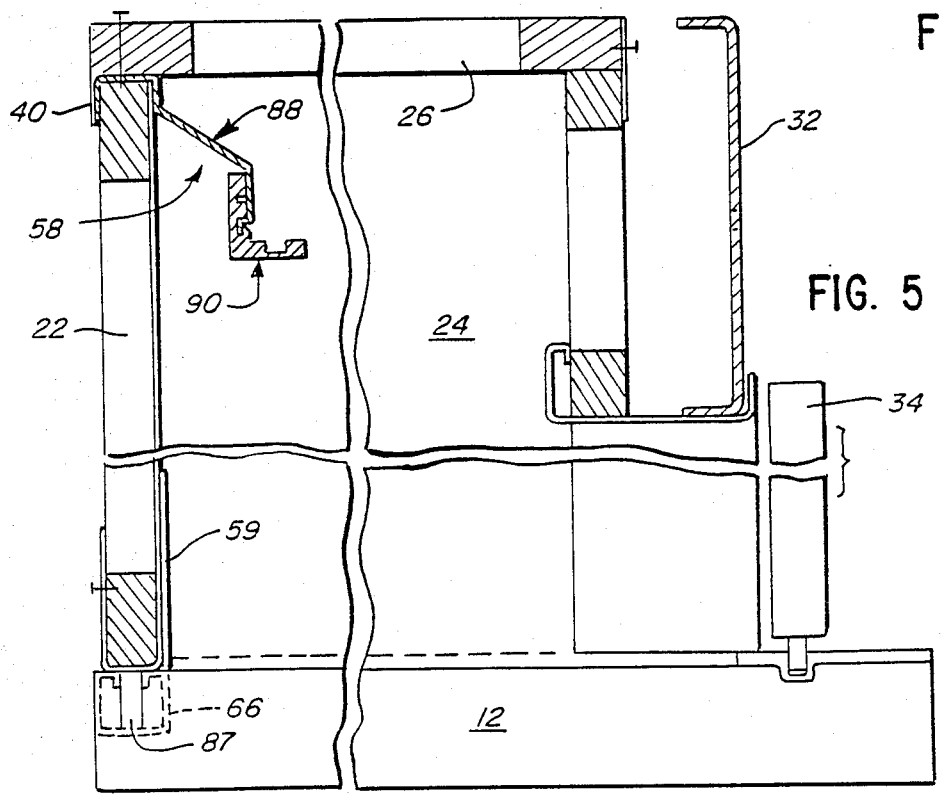
FIG. 5 is a fragmentary vertical section, on an enlarged scale, taken generally along line 5—5 of FIG. 2.

FIGS. 4 and 5 show in greater detail the various components of the invention in an assembled array.

FIG. 4 shows that support means in the form of vertically extending angle-braces, generally designated 46, are provided at the rear corners of the elevator cab, i.e at the juncture between rear wall 22 and side walls 24 These braces will be described in greater detail hereinafter. Suffice it to say, a rear leg 46a of each brace is preassembled and secured to the back side of a rear wall panel 22 and extends vertically along the edge thereof. The other leg 46b of each brace extends at a right-angle, forwardly for engaging the backside of a side wall panel 24 for operative engagement by clips 60 of the interengaging hanger means 38, as described hereinafter.

Left front wall 28 and right front wall 30 of the cab are generally standard structures fabricated of sheet metal. Each front wall structure includes a vertically extending, rearwardly projecting leg 48 for engaging the backsides of side wall panels 24 in cooperative engagement with hanger clips, generally designated 50 and described hereinafter. Left front wall structure 28 is formed with a recess, indicated by arrow 52, for accommodating control components for the elevator. A control panel 54 is mounted to cover the recess Conventional sliding doors 34 open and close an entry 56 defined between left and right front wall structures 28 and 30, respectively.

FIG. 5 shows the header assembly 32 which spans the front wall sections at the top cf the elevator cab. Drop ceiling support means, generally designated 58, also is clearly shown in this view, as described in greater detail hereinafter with reference to FIG. 13. Baseboards 59 are affixed along the lower edge portions of rear wall panel 22 and side wall panels 24 to conceal anchoring means 36 (FIG. 5). From the foregoing, it already can be visualized that the components of the modular elevator cab construction of this invention are designed for assembly onto platform 12 of the elevator cage substantially from within the area of the cab. This unique assembly procedure provided by the novel modular construction of this invention will now be described in conjunction with details of various of the assembly components.

Specifically, referring to FIGS. 6–8, hanger means 38 (FIG. 2) for assembling rear wall panel 22 and side wall panels 24 include a plurality of the hanger members or clips 60, secured to the backside of side wall panels 24 at predetermined locations adjacent the rear vertical edges thereof. Each hanger clip includes a flat base 60a having a pair of holes 60b through which screws can be inserted to affix the clip to the backside of the side wall panel. The clip has a contoured spring end 60c which can move under its own spring tension in the direction of double-headed arrow 62 (FIG. 7). A plurality of receptacles in the form of apertures 64 (FIG. 8) are stamped out of forwardly projecting leg 46b of brace 46 which previously was affixed to the backside of rear wall panel 22. In essence, the spring clips form a hook type engagement within apertures 64 whereby the side wall panels can be hung onto the rear panel in right-angular juxtaposition by an assembly team operating completely within the confines of the elevator cab.

The anchoring means 36 (FIG. 3) for anchoring rear wall panel 22 and side wall panels 24 to platform 12 are illustrated in greater detail in FIGS. 9-12. The anchoring means include channels 66 (see FIGS. 3 and 5) embedded in platform 12. The term "embedded" includes either setting the channels 66 in grooves, or seating them on recesses at the periphery of the platform as shown best in FIGS. 5 and 11. A rectangular nut 68 (FIG. 11) is positioned sideways into channel 66 and then turned so that the long dimension of the nut seats against the underside of overhanging flanges 70 of channel 66 A spring 72 biases the nut in an upward direction so that a securing bolt 74 can be threaded into the nut. An L-shaped bracket 76 is preassembled to the backside of the respective wall panel Specifically, each bracket 76 includes an upwardly extending leg 76a and a horizontally extending leg 76b. There is an opening 76c in the leg 76a for wrench clearance or external access to the bolt 74 if needed. The bracket is secured to the backside of the wall panel by fastening means such as screws 78 (FIG. 11) secured through holes 80 (FIG. 9) in leg 76a of the bracket. Horizontal leg 76b projects under the wall panel flush with the lower edge thereof and has a hole 82 in line with a threaded bore 84 in the nut 68, whereby the bolt 74 can be inserted through the hole 82 in the bracket to secure the bracket and, therefore, the wall panel to the channel 66. In order to facilitate insertion of a wrench or other appropriate tool for tightening bolt 74 to nut 68, properly located holes 86 (FIGS. 3 and 17) are precut into the bottom edge of the wall panel so that access can be gained to the bolt from inside the cab. It should be understood that a plurality of anchoring means or assemblies 38, as shown in detail in FIG. 11, are located about the base of the side walls of the elevator cab as illustrated and described in relation to FIG. 3. In addition, a plurality of blocks 87 (FIG. 5) are placed in channels 66 to support the wall panels in the channels during assembly.

The channels 66 and cooperating nuts 68, springs 72 and bolts 74 are commercial components, a well known type of which is available from Unistrut Corp. of Wayne, MI.

From the foregoing, it can be seen that erection or hanging of the wall panels and anchoring the wall panels to the elevator platform all are accomplished from within the confines of the elevator cab itself The next step is to install left and right front wall structures 28 and 30, respectively, to the front edges of side walls 24. As described in relation to FIGS. 4 and 5, these front wall structures are generally conventional in construction However, as described, hanger clips 50 (FIG. 4) are provided to hang the front wall structures to the front edges of the side wall panels. Hanger clips 50 are identical to clips 60 described in relation to FIGS. 6-8, but the clips 50 are secured to the backside of the wall panels in an inverted direction opposite that shown in FIGS. 6-8 for hooking into complementary apertures in legs 48 (FIG. 4) of the front wall structures as the front wall structures are lowered into engagement with and assembly to the side wall panels. Head section 32 then is installed, spanning the top of the front wall structures.

The next step is the installation or assembly of the drop ceiling support means 58 (FIG. 5) which is shown in greater detail in FIGS. 13 and 14 More particularly, the drop ceiling support means includes a plurality of brackets, generally designated 88 and a rectangular support frame, generally designated 90. Each bracket 88 includes a hook portion 92 that hooks over and embraces the top edges of the wall panels 22 and 24 so that the remainder of the brackets hang downwardly in the interior of the cab. Support frame 90 is formed by four elongated extruded members welded together at their corners, as at 94 (FIG. 14), to form a rectangular drop ceiling frame The extruded frame includes a groove 96 for receiving the appropriate drop ceiling components and a groove 98 for receiving a lip 100 at the lower distal end of bracket 88. In assembly, the drop ceiling frame is lifted toward the top of the elevator cab, lip 100 of each bracket 88 is inserted into groove 98, and the bracket is pivoted in the direction of arrow "C" (FIG. 13). The hook portion 92 of the bracket is hung onto the top edge of the respective wall panel The entire drop ceiling support means 58 now is suspended by a plurality of brackets 88 from the top edges of the wall panels without requiring any extraneous fastening means whatsoever, and the procedure is performed from within the cab assembly.

The next step is the installation of the canopy 26 which is performed by moving the canopy in a horizontal plane through the area above the cab within elevator stile 14 (FIG. 1) and lowering the canopy onto the top of the previously assembled rear, side and front walls. As stated above, canopy 26 has a peripheral skirt 40 (FIG. 3) that embraces the top edge portions of the walls to prevent the canopy from shifting on the walls. Once the canopy is in place, an installer can stand on it to fasten it to the tops of wall panel frames 22 and 24 and the front head section 32.

FIGS. 15 and 16 show the details for mounting control panel 54 (FIG. 4) in position to cover recess 52 in left front wall structure 28 The front panel is designed to have control components (not shown) of the elevator mounted on the backside thereof, with control buttons (not shown) projecting through the panel for operation by users of the elevator The control panel is designed for easy removal and for tilting away from the recess on the inside of the front wall structure to gain access to the control components without completely removing the control panel.

More particularly, as seen in FIG. 15, notches 104 are formed in bottom ends of the sides of control panel 54. These notches seat on a rib set along the bottom edge of recess 52. A flexible cord 106 may be affixed at its opposite ends to the backside of control panel 54 and inside recess 52 to prevent the panel from falling forwardly whereby an operator can work on control components 101 mounted to the back of the control panel.

Lastly, FIGS. 17 and 18 show a preferred embodiment of the structure cf rear wall panel 22 and side wall panels 24 Canopy 26 preferably is a similar structure. Specifically, a rectangular wood frame 110 surrounds a lightweight core 112. In addition, a wood cross frame component 114 is provided for supporting the interior handrail means of the elevator cab Lightweight core 112 is a honey-comb-type body 116 (FIG. 18) sandwiched between a pair of fiberglass sheets 118 Finally, an interior covering 120 is laminated to the inner face of the wall panel to provide any desired decor for the elevator cab interior.

The preferred panel structure has a honeycomb core 116 consisting of a phenolic dipped kraft paper, and the fiberglass sheets 118 are impregnated with epoxy resin The wood for the frame 110 and the cross frame component 114 is of a type that does not release resins which would interfere with the cure of the epoxy resin and its bonding to the kraft core, which is carried out at about 250° F. (21° C.). Suitable woods include bass and poplar.

The canopy 26, of course, has frame side members that carry the skirt 40; and in addition there are wood frames about the openings 42 and 44.

From the foregoing, it can be seen that a novel modular elevator cab construction has been provided wherein the entire assembly procedures are carried out substantially entirely from within the area of the cab itself. The surrounding wall panels or wall structures are assembled by spring clips requiring no extraneous fastening means during the assembly operation. The drop ceiling support means are assembled without extraneous fastening means while the fastenings for the canopy 26 are installed from on top of the cab.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A modular elevator cab construction for assembly onto a platform of an elevator stile substantially from within the area of the cab, comprising:

a rear wall panel and two side wall panels, including support means projecting from one of the wall panels at a juncture between the rear wall panel and each of the side wall panels; and complementary interengaging hanger means on backsides of adjacent panels for assembling the panels in proper right-angular juxtaposition, the hanger means including a plurality of sets of receptacle means and complementary hanger members, the receptacle means of each set being on one of the support means and the adjacent panel and the respective hanger member of each set being on the other of the support means and the adjacent panel at each said juncture, wherein said support means comprise angle plates with a first arm secured to an outer surface of a panel and a second arm lying outside an outer surface of an adjacent panel, said receptacle means comprise apertures in the support means, and said hanger members are located on the backside of said adjacent panel and comprise spring hooks for positioning in the apertures, the spring hooks being spring loaded in a direction perpendicualr to a plane including the adjacent panel.

* * * * *